(12) United States Patent
Mori (10) Patent No.: US 8,441,978 B2
(45) Date of Patent: May 14, 2013

(54) RELAY DEVICE, WIRELESS COMMUNICATION SYSTEM, AND WIRELESS COMMUNICATION METHOD

(75) Inventor: Masaru Mori, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 121 days.

(21) Appl. No.: 13/237,484

(22) Filed: Sep. 20, 2011

(65) Prior Publication Data

US 2012/0020273 A1   Jan. 26, 2012

Related U.S. Application Data

(63) Continuation of application No. PCT/JP2009/059431, filed on May 22, 2009.

(51) Int. Cl.
*H04J 3/08* (2006.01)

(52) U.S. Cl.
USPC ............ 370/315; 370/312; 370/390; 370/338

(58) Field of Classification Search ........................ None
See application file for complete search history.

(56) References Cited

U.S. PATENT DOCUMENTS

| 2005/0190821 | A1 | 9/2005 | Fujii et al. | |
| 2008/0045145 | A1* | 2/2008 | Nakatsugawa | 455/11.1 |
| 2009/0285145 | A1* | 11/2009 | Youn et al. | 370/312 |
| 2011/0310778 | A1* | 12/2011 | Seo et al. | 370/280 |

FOREIGN PATENT DOCUMENTS

| JP | 09-284195 | 10/1997 |
| JP | 2001-196994 | 7/2001 |
| JP | 2004-040665 | 2/2004 |
| JP | 2005-229524 | 8/2005 |
| JP | 2007-500482 | 1/2007 |
| JP | 2008-541607 | 11/2008 |
| WO | 2004/107693 | 12/2004 |
| WO | 2006/121376 | 11/2006 |

OTHER PUBLICATIONS

International Preliminary Report on Patentability with Written Opinion of the International Searching Authority issued for corresponding International Patent Application No. PCT/JP2009/059431, mailed Dec. 22, 2011. English translation attached.
International Search Report issued for corresponding International Patent Application No. PCT/JP2009/059431, mailed Aug. 25, 2009. English translation attached.

* cited by examiner

*Primary Examiner* — Duc C Ho
(74) *Attorney, Agent, or Firm* — Myers Wolin, LLC

(57) ABSTRACT

A relay device includes a receiver that receives a wireless signal and outputs the received signal; a regenerator that restores original data from the received signal, and generates a regeneration signal from the original data; a non-regenerator that generates, using the received signal, a non-regeneration signal; a switching controller that selects and outputs the non-regeneration signal when the received signal is a multicast signal, and that selects and outputs the regeneration signal when the received signal is a unicast signal; and a transmitter that transmits a signal output from the switching controller as a transmission signal.

12 Claims, 12 Drawing Sheets

RELAY DEVICE, WIRELESS COMMUNICATION SYSTEM, AND WIRELESS COMMUNICATION METHOD

CROSS REFERENCE TO RELATED APPLICATIONS

This application is a continuation application of International Application PCT/JP2009/059431, filed May 22, 2009, and designating the U.S., the entire contents of which are incorporated herein by reference.

FIELD

The embodiments discussed herein are related to a relay device, a wireless communication system, and a wireless communication method.

BACKGROUND

In a conventional wireless communication system, a relay device can be provided in places where radio waves from radio base stations are weak, such as in a building, a tunnel, and a mountain area, thereby enabling signal propagation in such places to be improved. At the relay device, the frequency of a radio wave received from the radio base station and the frequency at which the radio wave is transmitted to a mobile terminal is the same, whereby oscillation may be caused by an interfering signal generated by a transmitted signal that turns back to a receiving antenna. Thus, a relay device has been suggested that can suppress the interfering signal. A relay device has been further suggested that restores the original data from a received signal, regenerates a signal from the restored data, and transmits the regenerated signal (regeneration process), as well as a relay device that transmits the received signal as is (non-regeneration process). As a relay device, a wireless signal booster and/or a repeater described below are also known.

For example, the wireless signal booster includes a first amplifier that amplifies the received signal; a coupler that outputs a cancellation output signal obtained by combining the output from the first amplifier and an input canceller signal; and a quadrature detector for quadrature detection of the cancellation output signal and for conversion into a received quadrature signal. The wireless signal booster further includes a demodulator that demodulates the received quadrature signal and outputs demodulated data; a regenerator that regenerates the quadrature signal, based on the demodulated data and outputs the regenerated quadrature signal; a quadrature modulator for quadrature modulation of the regenerated quadrature signal; and a second amplifier that amplifies the quadrature-modulated signal and outputs a booster output signal. The wireless signal booster further includes a complex correlator that calculates and outputs as a residual interfering signal, the complex function of the quadrature signal received from the quadrature detector and the regenerated quadrature signal from the regenerator; and an attenuator that attenuates the booster output signal from the second amplifier according to attenuation characteristics information that is input. The wireless signal booster further includes a phase shifter that controls the phase of the output from the attenuator according to phase rotation information that is input, and outputs the cancel signal; and a controller that provides, based on the correlation information indicating the level of the residual interfering signal, the attenuation characteristics information to the attenuator and the phase rotation information to the phase shifter. The controller repeatedly changes the attenuation characteristics information and the phase rotation information slightly upward and downward from a given value, detects the correlation information during the change, and updates the attenuation characteristics information and the phase rotation information such that the correlation information decreases within the range of the change (see, for example, Japanese Laid-Open Patent Publication No. H09-284195).

On the other hand, the repeater includes a delay unit that relays a signal from a receiving antenna directly to a transmitting antenna so as to be output therefrom as a transmission signal, and induces a given amount of delay to the received signal; a suppression signal generating unit that generates a suppression signal for suppressing an interfering signal caused by a transmission signal that turns back to the receiving antenna; and a feedback unit that feeds the suppression signal back to the received signal. The suppression signal generating unit detects a residual component by a correlation calculation based on the received signal to which the suppression signal has been fed back and the transmission signal, and generates the suppression signal based on the residual component (see, for example, Japanese Laid-Open Patent Publication No. 2004-40665).

However, the conventional technology has the following problems. In multicast service, multiple radio base stations transmit the same data at the same time to mobile terminals. Thus, a mobile terminal may receive a signal from a radio base station A via a relay device, as well as receive a signal directly from a radio base station B. In this case, delay is caused at the relay device if the relay device performs the regeneration process, and if delay is caused, since the mobile terminal cannot synchronize the signals, the mobile terminal becomes unable to receive the signal transmitted through multicast communication.

SUMMARY

According to an aspect of an embodiment, a relay device includes a receiver that receives a wireless signal and outputs the received signal; a regenerator that restores original data from the received signal, and generates a regeneration signal from the original data; a non-regenerator that generates, using the received signal, a non-regeneration signal; a switching controller that selects and outputs the non-regeneration signal when the received signal is a multicast signal, and that selects and outputs the regeneration signal when the received signal is a unicast signal; and a transmitter that transmits a signal output from the switching controller as a transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. However, the invention is not limited to the embodiments. In the following description of the embodiments, similar components are assigned similar signs and redundant description is omitted. Components having the same name are distinguished from each other by a character such as "A" and "B" following the name.

Figure 1:
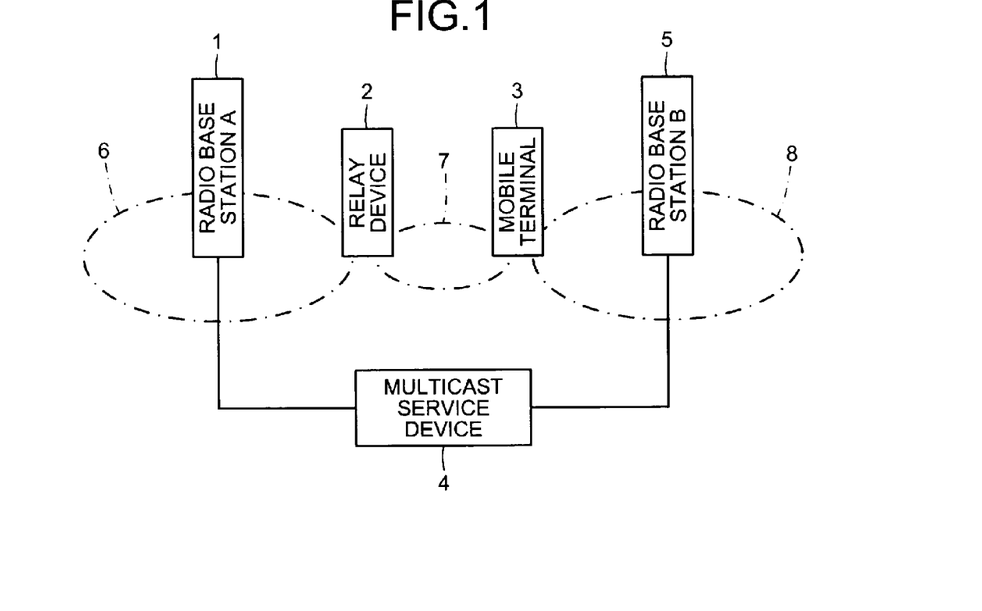
FIG. 1 is a block diagram of a wireless communication system according to a first embodiment.

FIG. 1 is a block diagram of a wireless communication system according to a first embodiment. As depicted in FIG. 1, the wireless communication system includes a radio base station A1, a relay device 2, a mobile terminal 3, and a multicast service device 4. The radio base station A1 transmits a wireless unicast signal, and during multicast service, transmits a wireless multicast signal. A radio base station B5 different from the radio base station A1 operates similarly. The relay device 2 receives the signal transmitted from the radio base station A1. If the signal received from the radio base station A1 is a unicast signal, the relay device 2 restores the original data from the received signal, generates a regeneration signal from the data, and transmits the regeneration signal. If the signal received from the radio base station A1 is a multicast signal, the relay device 2 uses the received signal as is to generate a non-regeneration signal and transmits the non-regeneration signal. The multicast service device 4 provides multicast service. The mobile terminal 3 can move throughout a service area 6 of the radio base station A1, a service area 7 of the relay device 2, a service area 8 of the radio base station B5, and other areas. The service area 7 of the relay device 2 includes an area that belongs neither to the service area 6 of the radio base station A1 nor the service area 8 of the radio base station B5. The service area 7 of the relay device 2 is adjacent to the service area 6 of the radio base station A1, or includes a part of the service area 6 of the radio base station A1.

Figure 2:
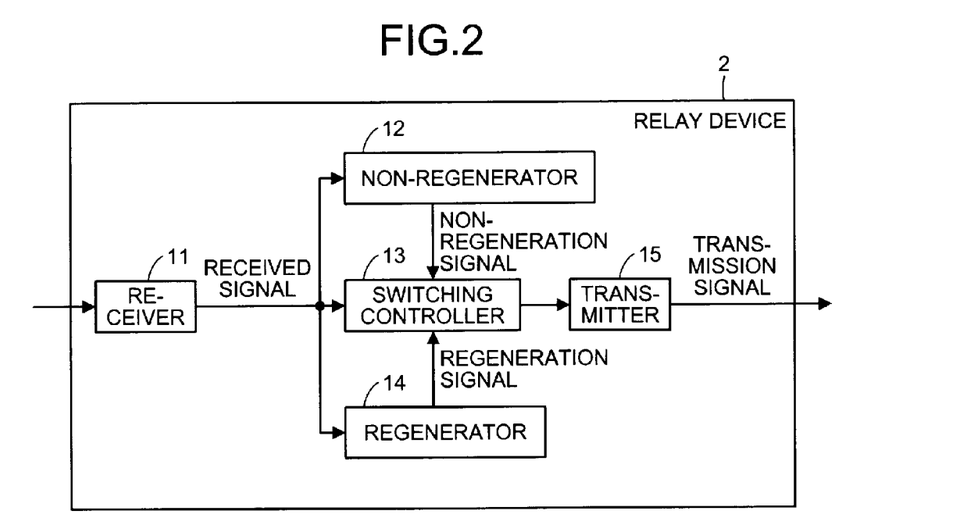
FIG. 2 is a block diagram of a relay device according to the first embodiment.

FIG. 2 is a block diagram of the relay device according to the first embodiment. As depicted in FIG. 2, the relay device 2 includes a receiver 11, a non-regenerator 12, a switching controller 13, a regenerator 14, and a transmitter 15. The receiver 11 receives a wireless signal and outputs the received signal. The non-regenerator 12 generates a non-regeneration signal using the received signal as is. The regenerator 14 restores the original data from the received signal, and regenerates the signal from the data (generates a regeneration signal). The switching controller 13 selects and outputs the non-regeneration signal when the received signal is a multicast signal; and selects and outputs the regeneration signal when the received signal is a unicast signal, respectively. The transmitter 15 transmits, as a transmission signal, the signal output from the switching controller 13.

Figure 3:
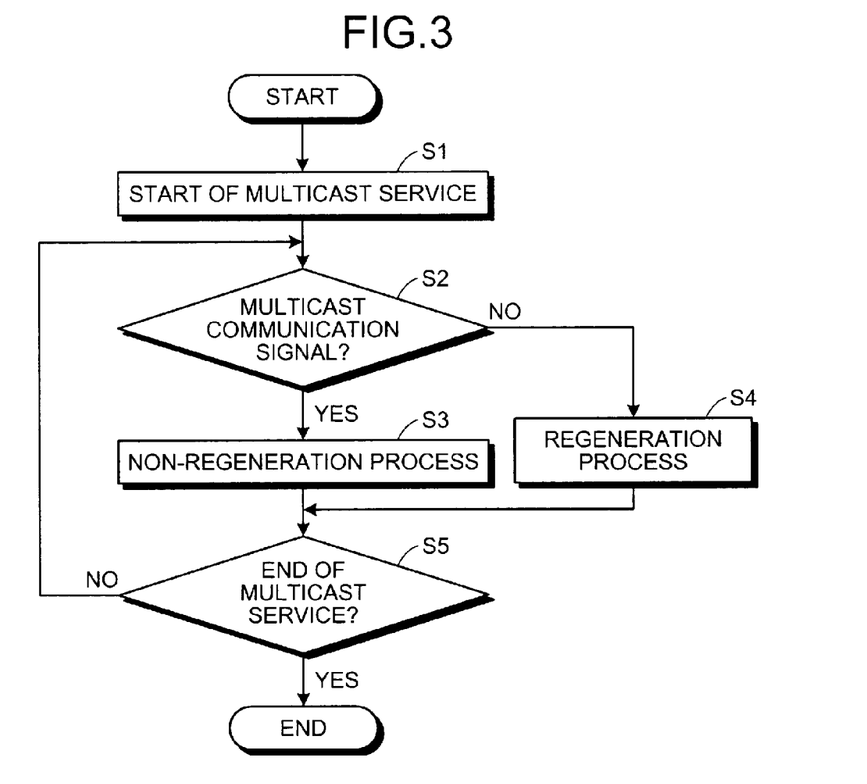
FIG. 3 is a flowchart of a wireless communication method according to the first embodiment.

FIG. 3 is a flowchart of a wireless communication method according to the first embodiment. As depicted in FIG. 3, the multicast service device 4 starts multicast service (step S1), and the relay device 2 determines whether a signal received from the radio base station A1 is a multicast signal (step S2). If so (step S2: YES), the non-regenerator 12 of the relay device 2 generates a non-regeneration signal by using the received signal as is, and the transmitter 15 transmits the non-regeneration signal (non-regeneration process, step S3). If the received signal from the radio base station A1 is a unicast signal (step S2: NO), the regenerator 14 restores the original data from the received signal and generates a regeneration signal from the data, and the transmitter 15 transmits the regeneration signal (regeneration process, step S4). The relay device 2 determines whether the multicast service has ended (step S5). If the multicast service continues (step S5: NO), the process returns to step S2. If the multicast service has ended (step S5: YES), the relay device 2 ends the sequence of processes and resumes unicast communication, for example.

According to the first embodiment, the relay device 2 performs the non-regeneration process when receiving a multicast signal from the radio base station A1, thereby reducing the amount of delay caused by the relay device 2. For example, if the mobile terminal 3 is located near the boundary between the service area 7 of the relay device 2 and the service area 8 of the radio base station B5 as depicted in FIG. 1, the mobile terminal 3 receives a multicast signal from the radio base station A1 via the relay device 2, and further receives a multicast signal directly from the radio base station B5. In this case, due to the relay by the relay device 2, the multicast signal from the radio base station A1 is received by the mobile terminal 3 later than the multicast signal from the radio base station B5. On the other hand, according to the first embodiment, the amount of delay caused by the relay device 2 is reduced such that the multicast signals can be synchronized at the mobile terminal 3, thereby enabling the mobile terminal 3 to properly receive signals transmitted through multicast communication from multiple radio base stations. On the other hand, the relay device 2 performs the regeneration process during unicast communication, thereby bringing about the advantages of the regeneration process (for example, a received signal that is distorted can be reshaped and transmitted by the relay device 2).

In a second embodiment, a mobile communication system capable of multicast communication and unicast communication, such as the 3rd Generation Partnership Project (3GPP), Long Term Evolution (LTE), and LTE-Advanced is taken as an example of the wireless communication system. LTE prescribes mobile communication system specifications for standardization under 3GPP. LTE-Advanced is an advanced system of LTE. Earthquake and Tsunami Warning System (ETWS) and Enhanced-Multimedia Broadcast Multicast Services (E-MBMS) are taken as an example of the multicast service. E-MBMS is based on MBMS Single Frequency Network (MBSFN) that is a mobile multicast service using a network of a single frequency. Mobility Management Entity/Serving Gateway (MME/S-GW) and MBMS Gateway/MICE (MBMS GW/MICE) are taken as an example of the multicast service device.

Figure 4:
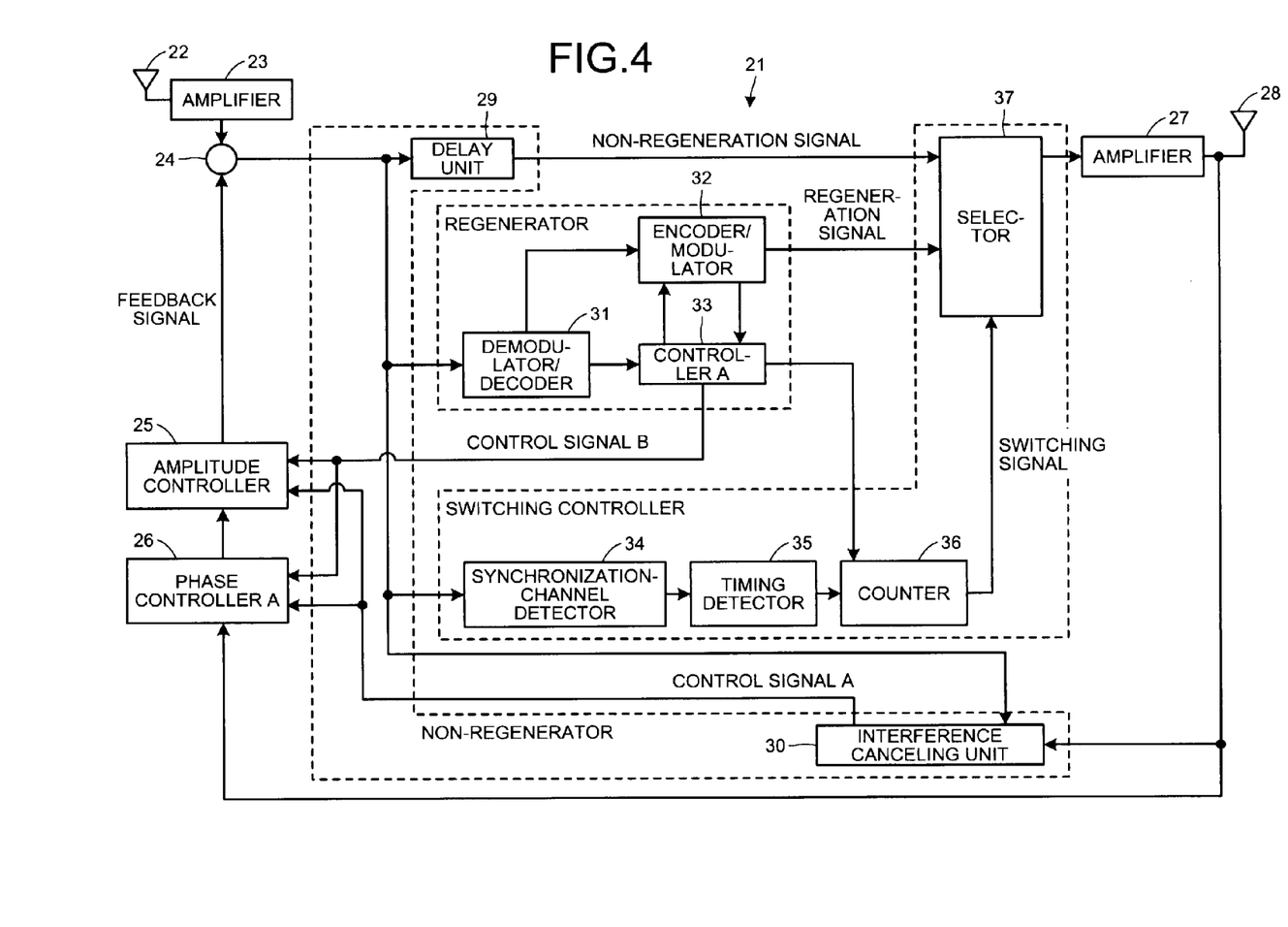
FIG. 4 is a block diagram of the relay device according to a second embodiment.

FIG. 4 is a block diagram of the relay device according to the second embodiment. As depicted in FIG. 4, the relay device 21 includes a receiving antenna 22, a reception-signal amplifier 23, a coupler 24, an amplitude controller 25, a phase controller A26, a transmission-signal amplifier 27, and a transmitting antenna 28. The receiving antenna 22 receives a wireless signal from the radio base station. The reception-signal amplifier 23 amplifies the signal received by the receiving antenna 22. The transmission-signal amplifier 27 amplifies the signal to be transmitted. The transmitting antenna 28 transmits the signal output from the transmission-signal amplifier 27. The phase controller A26 controls the phase of the signal output from the transmission-signal amplifier 27. The amplitude controller 25 controls the amplitude of the signal output from the phase controller A26. The coupler 24 outputs a signal obtained by coupling the signal output from the reception-signal amplifier 23 and a feedback signal output from the amplitude controller 25. The receiving antenna 22 and the reception-signal amplifier 23 function as a receiver. The transmission-signal amplifier 27 and the transmitting antenna 28 function as a transmitter.

The relay device 21 further includes a delay unit 29 and an interference canceling unit 30. The delay unit 29 outputs, as the non-regeneration signal, a signal obtained by delaying the signal output from the coupler 24. The interference canceling unit 30 outputs a control signal A, based on the signal output from the coupler 24 and the signal output from the transmission-signal amplifier 27. During the non-regeneration process, the phase controller A26 and the amplitude controller 25 control the phase and the amplitude, based on the control signal A, respectively, thereby suppressing the interference due to receiving the signal transmitted from the transmitting antenna 28 by the receiving antenna 22. The delay unit 29 and the interference canceling unit 30 function as a non-regenerator.

The relay device 21 further includes a demodulator/decoder 31, an encoder/modulator 32, and a controller A33. The demodulator/decoder 31 demodulates and decodes the signal output from the coupler 24 and restores the original data. The encoder/modulator 32 encodes and modulates the original data restored by the demodulator/decoder 31 and generates the regeneration signal. The controller A33 controls the generation of the regeneration signal by the encoder/modulator 32. The controller A33 determines whether the multicast service is currently provided based on the original data generated by the demodulator/decoder 31, and notifies a counter 36 described later whether the multicast service is currently provided. The controller A33 outputs a control signal B, based on the signal output from the demodulator/decoder 31 and the signal output from the encoder/modulator 32. During the regeneration process, the phase controller A26 and the amplitude controller 25 control the phase and the amplitude based on the control signal B, respectively, thereby suppressing interference due to reception of the signal transmitted from the transmitting antenna 28, by the receiving antenna 22. The demodulator/decoder 31, the encoder/modulator 32, and the controller A33 function as a regenerator.

The relay device 21 further includes a synchronization-channel detector 34, a timing detector 35, the counter 36, and a selector 37. The synchronization-channel detector 34 detects a synchronization channel from the signal output from the coupler 24, and establishes wireless frame synchronization. The timing detector 35 detects the timing of the wireless frame, and outputs a timing signal. The counter 36 counts subframes of the wireless frame based on a timing signal output from the timing detector 35. The counter 36 determines a switching point of subframes of multicast communication and subframes of unicast communication, based on the count of the subframes and notification from the controller A33, and generates a switching signal. Based on the switching signal, the selector 37 selects either the non-regeneration signal output from the delay unit 29 or the regeneration signal output from the encoder/modulator 32 and outputs the selected signal to the transmission-signal amplifier 27 as the signal to be transmitted. The synchronization-channel detector 34, the timing detector 35, the counter 36, and the selector 37 function as a switching controller.

Figure 5:
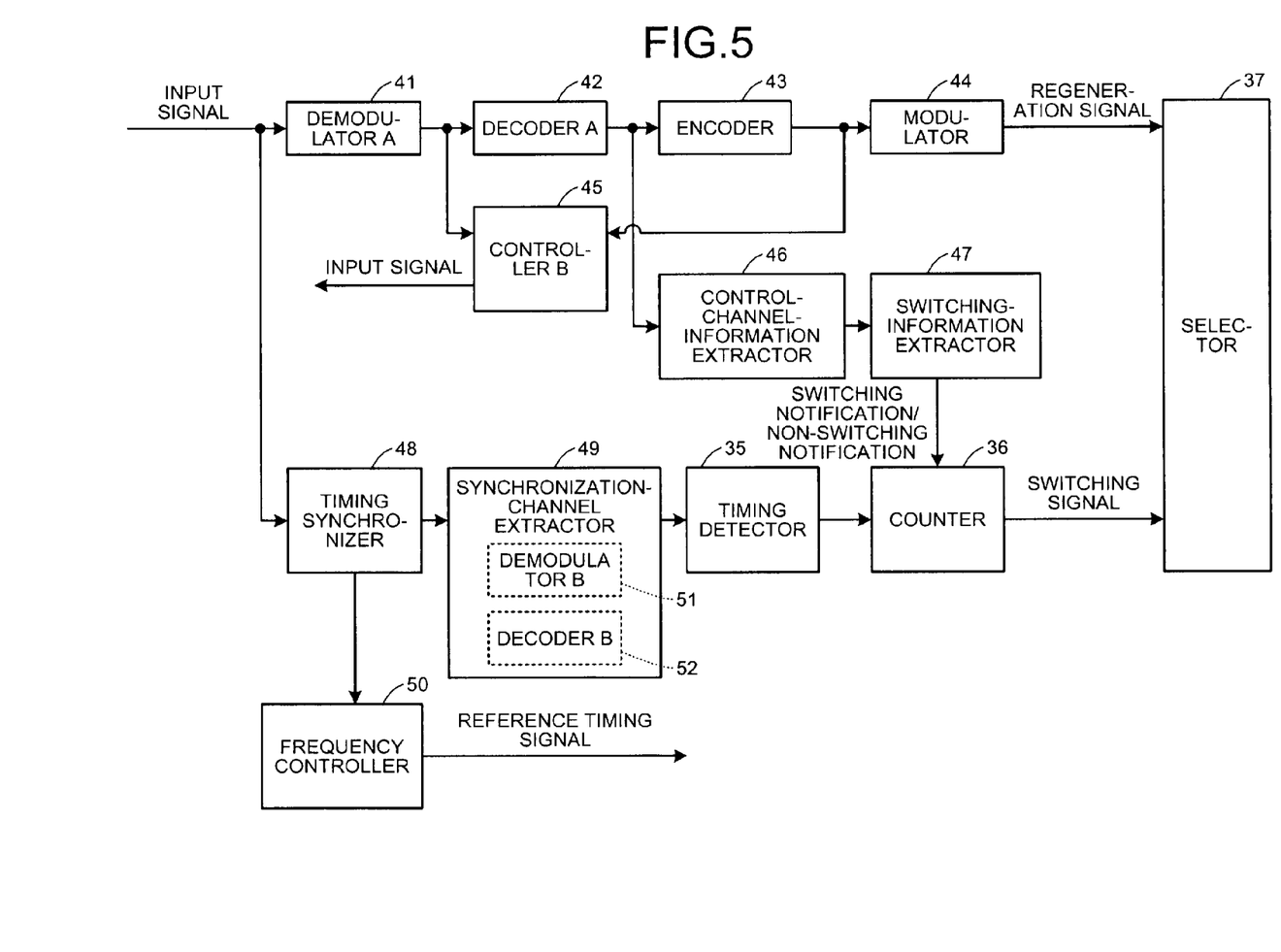
FIG. 5 is a block diagram of a main part of the relay device according to the second embodiment.

FIG. 5 is a block diagram of a main part of the relay device according to the second embodiment. An example of the regenerator and the switching controller is depicted in FIG. 5. As depicted in FIG. 5, the relay device 21 includes, as the regenerator, a demodulator A41, a decoder A42, an encoder A43, a modulator 44, a controller B45, a control-channel-information extractor 46, and a switching-information extractor 47. The demodulator A41 demodulates the input signal (i.e., the signal output from the coupler 24). The decoder A42 decodes the signal output from the demodulator A41 and restores the original data. The demodulator A41 and the decoder A42 function as the demodulator/decoder 31. The encoder A43 encodes the original data restored by the demodulator/decoder 31. The modulator 44 modulates the signal output from the encoder A43 and generates the regeneration signal. The encoder A43 and the modulator 44 function as the encoder/modulator 32.

The controller B45 generates the control signal B, based on the signal output from the demodulator A41 and the signal output from the encoder A43. The control-channel-information extractor 46 extracts control channel information, based on the original data restored by the decoder A42. The switching-information extractor 47 extracts from the control channel information, information indicating the start or the end of multicast service. When information indicating the start of the multicast service is extracted, the switching-information extractor 47 sends switching notification to the counter 36 until information indicating the end of the multicast service is extracted. During the time period when the multicast service is not provided, the switching-information extractor 47 sends non-switching notification to the counter 36. The controller B45, the control-channel-information extractor 46, and the switching-information extractor 47 function as the controller A33.

The relay device 21 includes, as the switching controller, a timing synchronizer 48, a synchronization-channel extractor 49, the timing detector 35, the counter 36, the selector 37, and a frequency controller 50. The timing synchronizer 48 performs synchronization based on the input signal (i.e., the signal output from the coupler 24). The synchronization-channel extractor 49 includes a demodulator B51 and a decoder B52, and performs the demodulation and the decoding and extracts the synchronization channel. The timing detector 35, the counter 36, and the selector 37 have been described above with reference to FIG. 4. However, as notification from the controller A33, the counter 36 receives the switching notification or the non-switching notification from the switching-information extractor 47. The frequency controller 50 generates a reference timing signal based on the signal output from the timing synchronizer 48, and provides the reference timing signal to each unit of the relay device. The timing synchronizer 48, the synchronization-channel extractor 49, and the frequency controller 50 function as the synchronization-channel detector 34.

Figure 6:
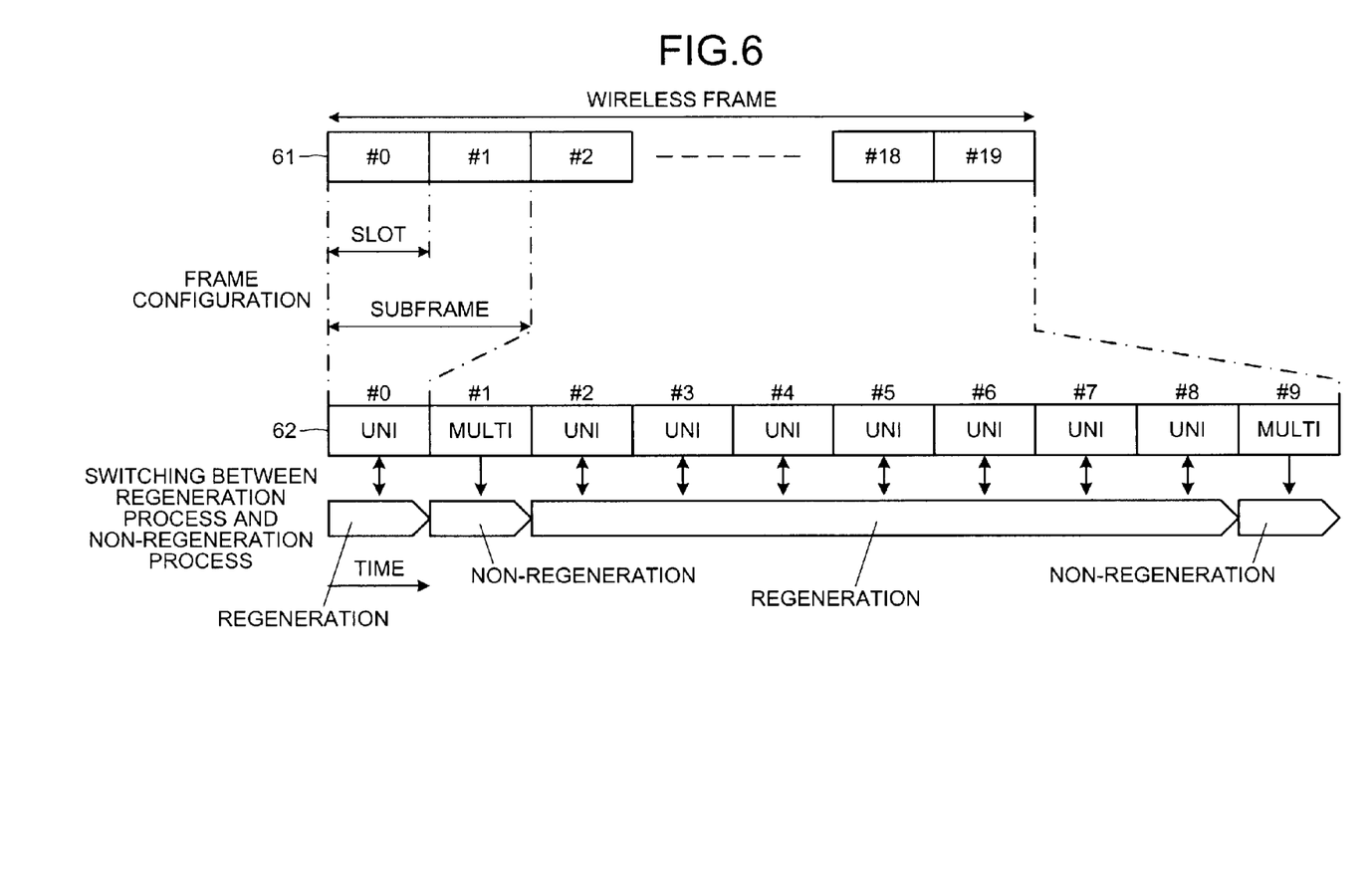
FIG. 6 is a schematic diagram of a wireless communication frame according to the second embodiment.

FIG. 6 is a schematic diagram of a wireless communication frame according to the second embodiment. As depicted in FIG. 6, a wireless frame of LTE includes 20 slots 61 from #0 to #19, for example. A subframe 62 includes 2 slots 61. For example, subframe #0 includes slot #0 and slot #1; subframe #1 includes slot #2 and slot #3 (not depicted); ... ; subframe #9 includes slot #18 and slot #19, i.e., a wireless frame includes 10 subframes 62 from #0 to #9, for example. In LTE, subframes #1 and #9 are assigned to multicast communication and subframes #0 and #2 to #8 are assigned to unicast communication. Thus, a switching point between a subframe for multicast communication (#1 and #9) and a subframe for unicast communication (#0 and #2 to #8) can be determined by counting the subframes at the counter 136, and the regeneration process and the non-regeneration process can be switched.

Figure 7:
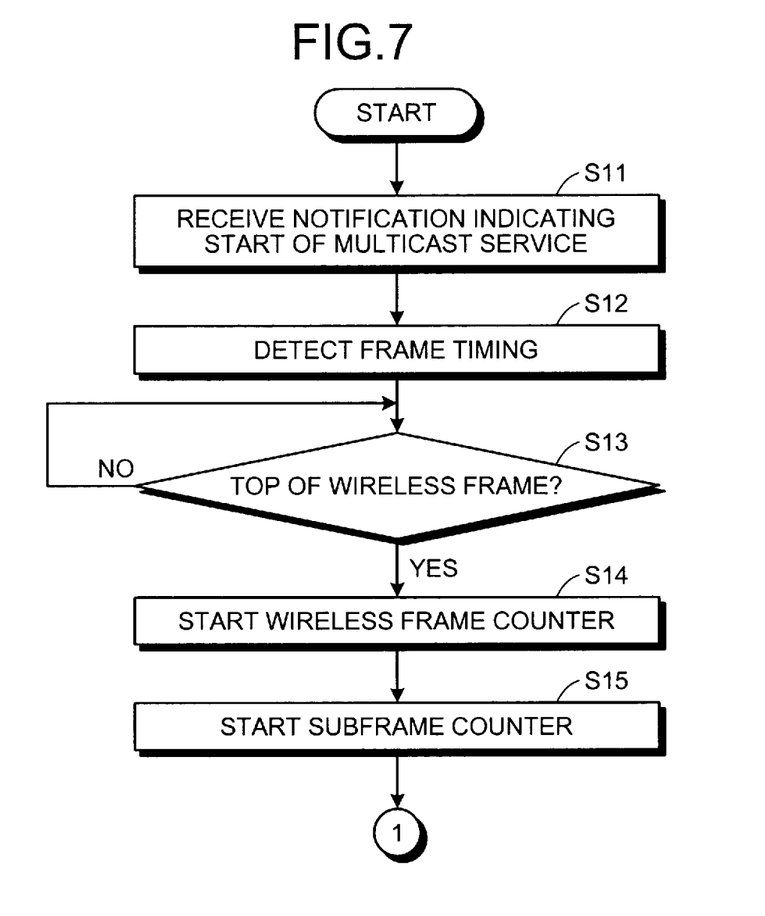
FIGS. 7 and 8 are flowcharts of a wireless communication method according to the second embodiment.
Figure 8:
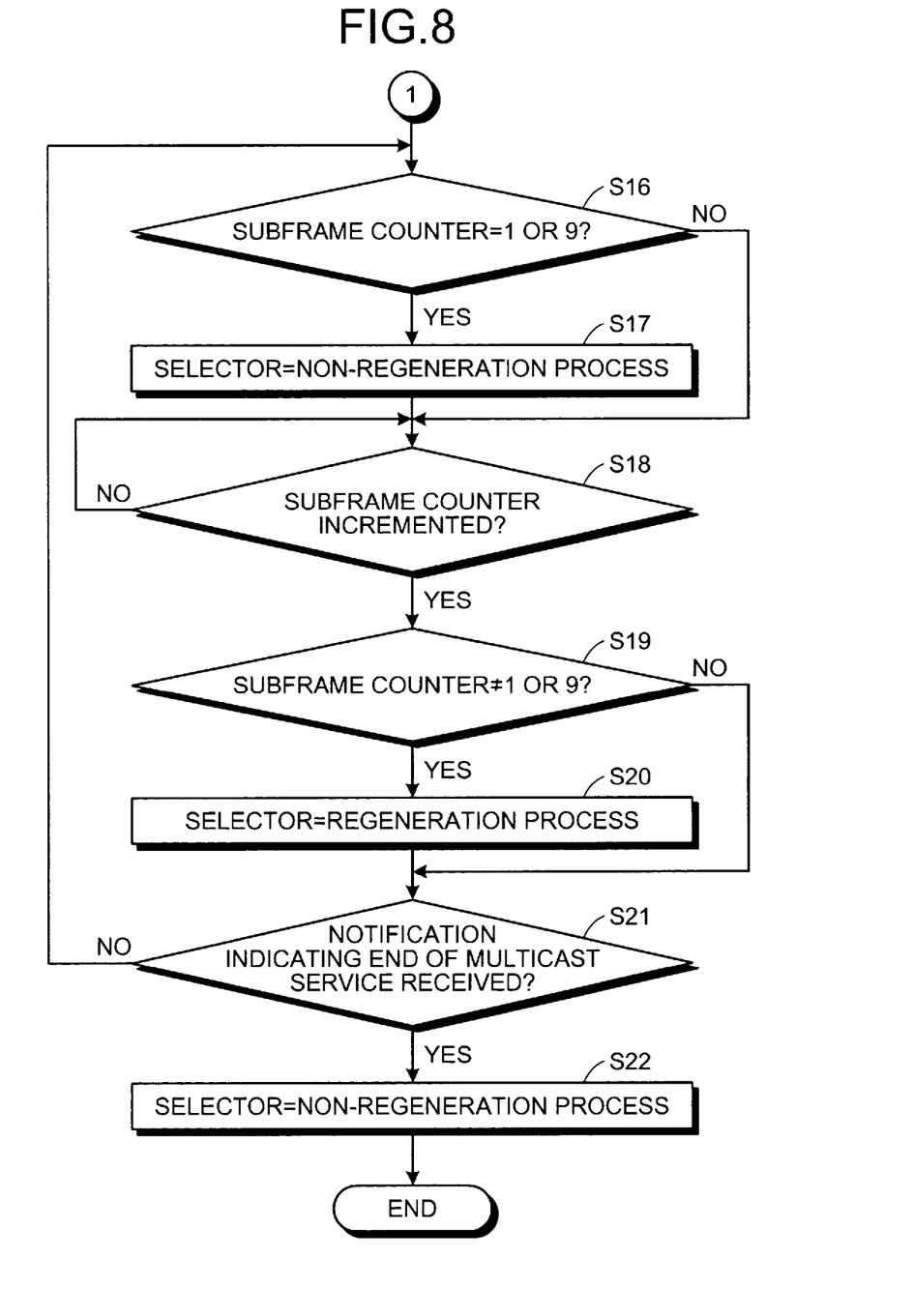

FIGS. 7 and 8 are flowcharts of a wireless communication method according to the second embodiment. As depicted in FIG. 7, if the relay device 21 receives, during unicast service, notification indicating the start of multicast service from the radio base station (step S11), the relay device 21 detects the wireless frame timing via the timing synchronizer 48 and the synchronization-channel extractor 49 (step S12). The relay device 21 determines whether the detected timing is the top of the wireless frame (step S13), and if not (step S13: NO), stands by until the top of the wireless frame is detected. When the relay device 21 detects the top of the wireless frame (step S13: YES), the relay device 21 starts a wireless frame counter (step S14). The wireless frame counter is included in the timing detector 35. The relay device 21 starts a subframe counter (step S15). The subframe counter is included in the counter 36.

As depicted in FIG. 8, the relay device 21 determines if the value of the subframe counter is 1 or 9 (step S16). If the value of the counter is 1 or 9 (step S16: YES), the relay device 21 selects the non-regeneration process by the selector 37, and outputs the non-regeneration signal from the selector 37 (step S17). If the value of the subframe counter is 0 or any one of 2 to 8 (step S16: NO), without the switching by the selector 37, the relay device 21 determines whether the subframe counter has been incremented (step S18). If not (step S18: NO), the relay device 21 waits for the counter to be incremented. When the counter is incremented (step S18: YES), the relay device 21 determines if the value of the counter is not 1 or 9 (step S19). If the value is not 1 or 9 (step S19: YES), the relay device 21 selects the regeneration process by the selector 37, and outputs the regeneration signal from the selector 37 (step S20). If the value of the counter is 1 or 9 (step S19: NO), without the switching by the selector 37, the relay device 21 determines whether notification indicating the end of the multicast service has been received from the radio base station (step S21). If not (step S21: NO), the process returns to step S16. If notification has been received (step S21: YES), the relay device 21 selects the non-regeneration process by the selector 37, and outputs the non-regeneration signal from the selector 37 (step S22), thereby ending the sequence of processes and resuming unicast service.

Figure 9:
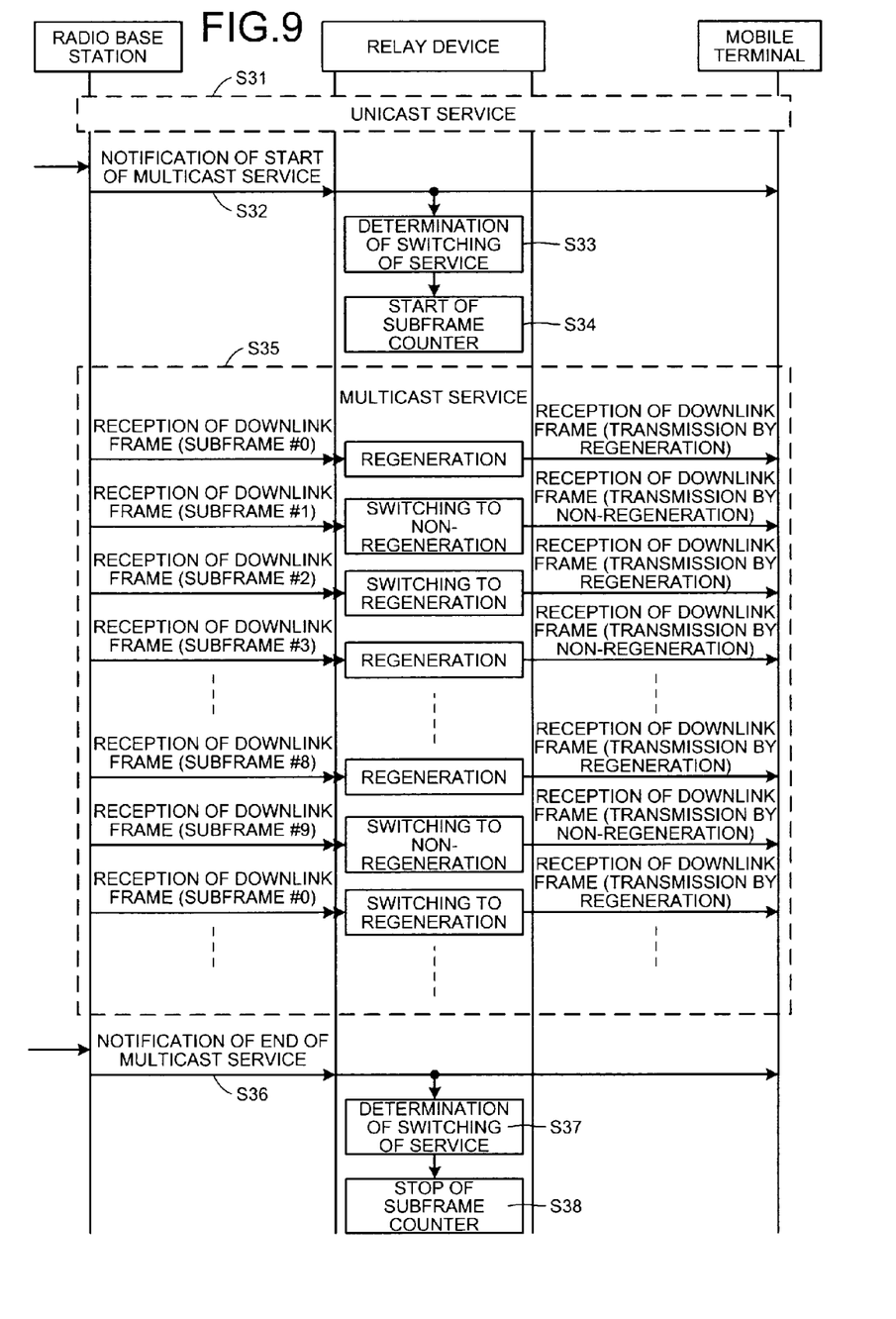
FIG. 9 is a sequence diagram of wireless communication performed by the wireless communication system according to the second embodiment.

FIG. 9 is a sequence diagram of wireless communication performed by the wireless communication system according to the second embodiment. As depicted in FIG. 9, if the relay device 21 receives, during unicast service (step S31), notification indicating the start of multicast service from the radio base station (step S32), the relay device 21 determines to switch from unicast service to multicast service (step S33), and starts the subframe counter (step S34). If the relay device 21 receives, during multicast service (step S35), a subframe of #0 or any one from #2 to #8 from the radio base station, the relay device 21 relays the signal by the regeneration process and transmits the regeneration signal to the mobile terminal. If the relay device 21 receives, during multicast service (step S35), a subframe of #1 or #9 from the radio base station, the relay device 21 relays the signal by the non-regeneration process and transmits the non-regeneration signal to the mobile terminal. When the relay device 21 receives notification indicating the end of the multicast service from the radio base station (step S36), the relay device 21 determines to switch from multicast service to unicast service (step S37), and stops the subframe counter (step S38). Switching between unicast service and multicast service is determined by the switching-information extractor 47.

According to the second embodiment, advantages similar to those of the first embodiment can be obtained. Further, differences in the time required for wireless multicast signals transmitted from adjacent radio base stations to arrive at the mobile terminal can be reduced. Thus, the mobile terminal can continue to receive multicast service seamlessly even when the mobile terminal moves between adjacent radio base stations.

Figure 10:
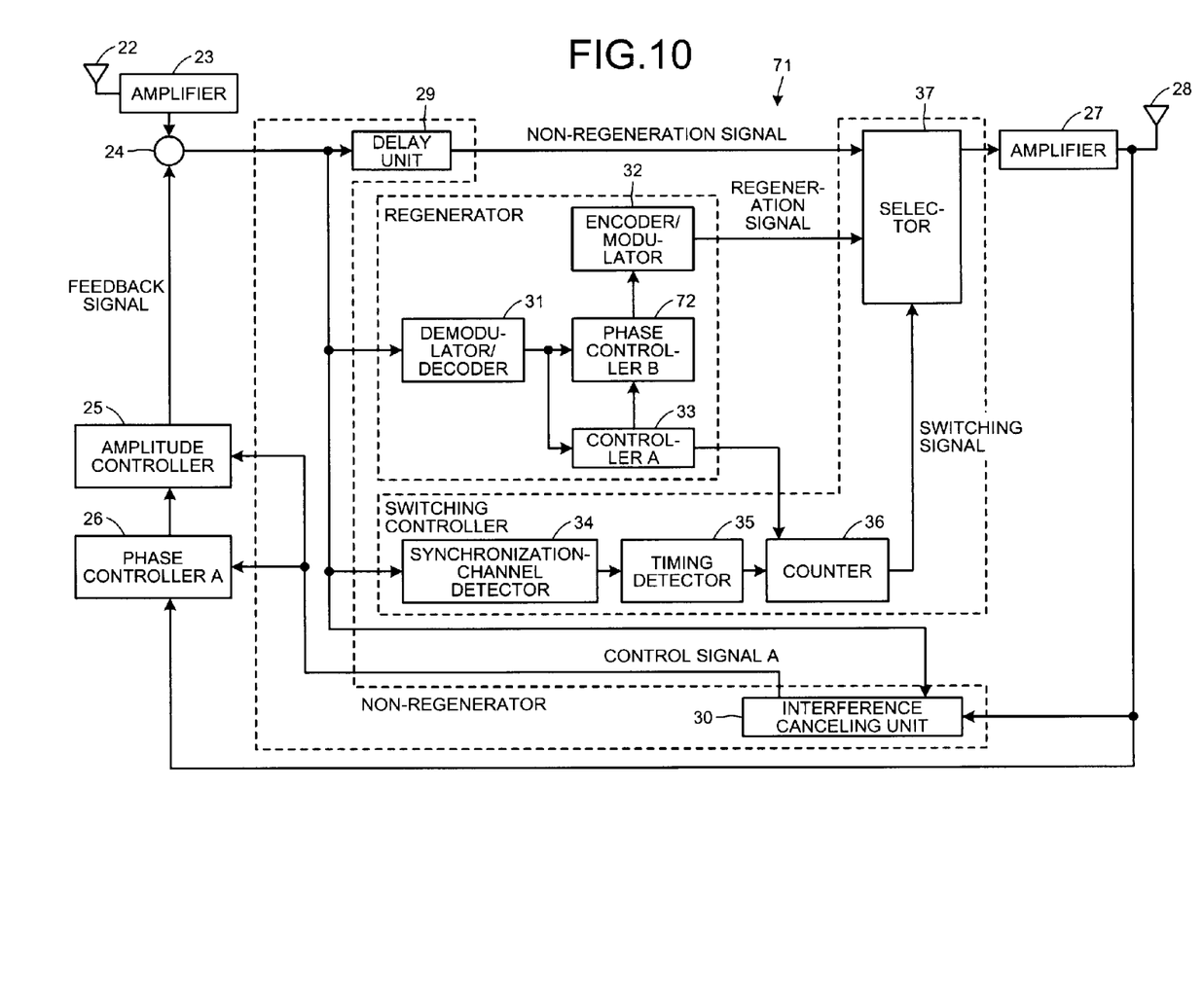
FIG. 10 is a block diagram of the relay device according to a third embodiment.

FIG. 10 is a block diagram of the relay device according to a third embodiment. As depicted in FIG. 10, the relay device 71 has a configuration similar to the second embodiment and in addition to the phase controller A26, includes a phase controller B72 that performs phase control during the regeneration process in place of the phase controller A26 and the amplitude controller 25. Similar to the second embodiment, the phase control and the amplitude control during the non-regeneration process is performed by the phase controller A26 and the amplitude controller 25.

Figure 11:
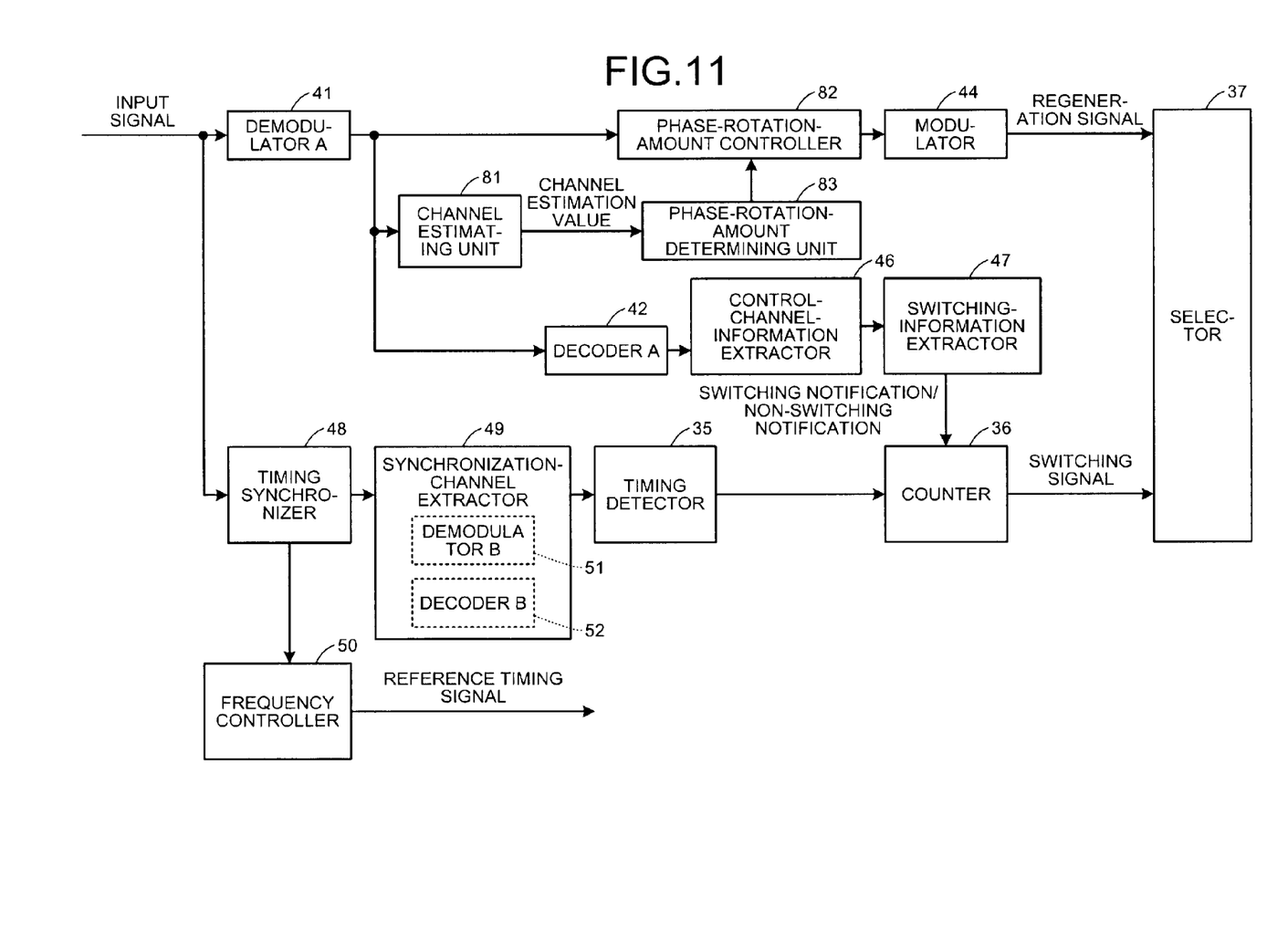
FIG. 11 is a block diagram of the main part of the relay device according to the third embodiment.

FIG. 11 is a block diagram of the main part of the relay device according to the third embodiment. An example of the regenerator and the switching controller is depicted in FIG. 11. As depicted in FIG. 11, the relay device 71 has a configuration similar to the second embodiment and includes a channel estimating unit 81, a phase-rotation-amount controller 82, and a phase-rotation-amount determining unit 83 in place of the encoder A43 and the controller B45. The channel estimating unit 81 estimates a channel for a path from the radio base station, based on the signal output from the demodulator A41. The phase-rotation-amount determining unit 83 determines the amount of phase rotation, based on the channel estimation value output from the channel estimating unit 81. The phase-rotation-amount controller 82 controls the amount of phase rotation of the signal output from the demodulator A41, based on the amount of phase rotation determined by the phase-rotation-amount determining unit 83. The signal output from the phase-rotation-amount controller 82 is sent to the modulator 44. The channel estimating unit 81, the phase-rotation-amount controller 82, and the phase-rotation-amount determining unit 83 function as the phase controller B72. In the third embodiment, other components and operations are similar to the second embodiment. According to the third embodiment, advantages similar to the second embodiment can be obtained.

Figure 12:
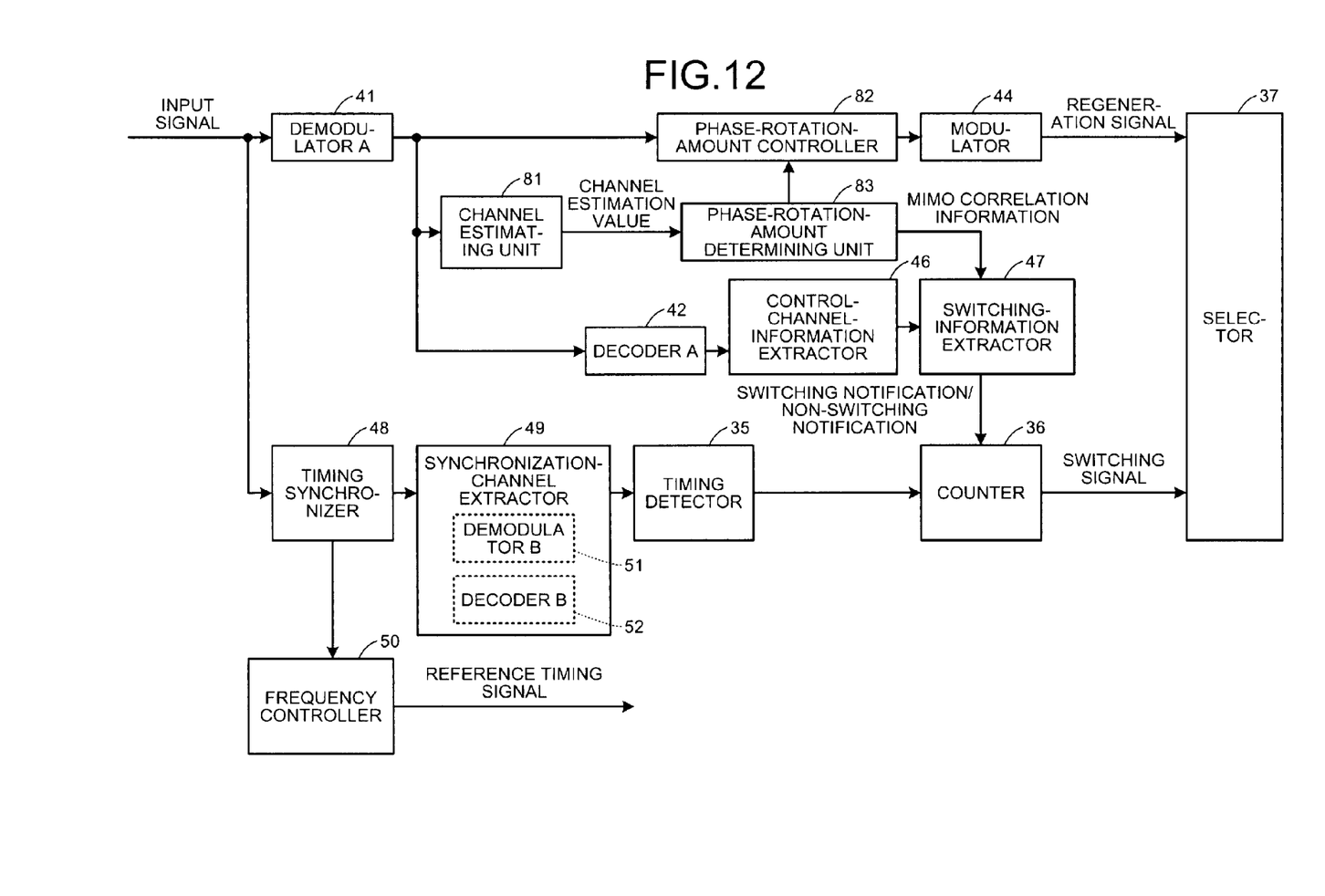
FIG. 12 is a block diagram of the relay device according to a fourth embodiment.

FIG. 12 is a block diagram of the relay device according to a fourth embodiment. As depicted in FIG. 12, the relay device according to the fourth embodiment has a configuration similar to the third embodiment, but switches between the regeneration process and the non-regeneration process during Multiple Input Multiple Output (MIMO) mode, based on the correlation between the transmitting antenna and the receiving antenna. The phase-rotation-amount determining unit 83 provides MIMO correlation information to the switching-information extractor 47 that, during the multicast service and based on the MIMO correlation information, outputs the switching/non-switching notification. If the correlation value between the transmitting antenna and the receiving antenna is more than or equal to a threshold, the switching-information extractor 47 switches to the regeneration process in which the amount of phase rotation is controlled by the channel estimating unit 81, the phase-rotation-amount controller 82, and the phase-rotation-amount determining unit 83. If the correlation value is less than the threshold, the switching-information extractor 47 switches to the non-regeneration process. The threshold is set in advance by the communication service provider. The non-regeneration process is selected during a mode other than the MIMO mode, for example, Single Input Multiple Output (SIMO) mode.

Figure 13:
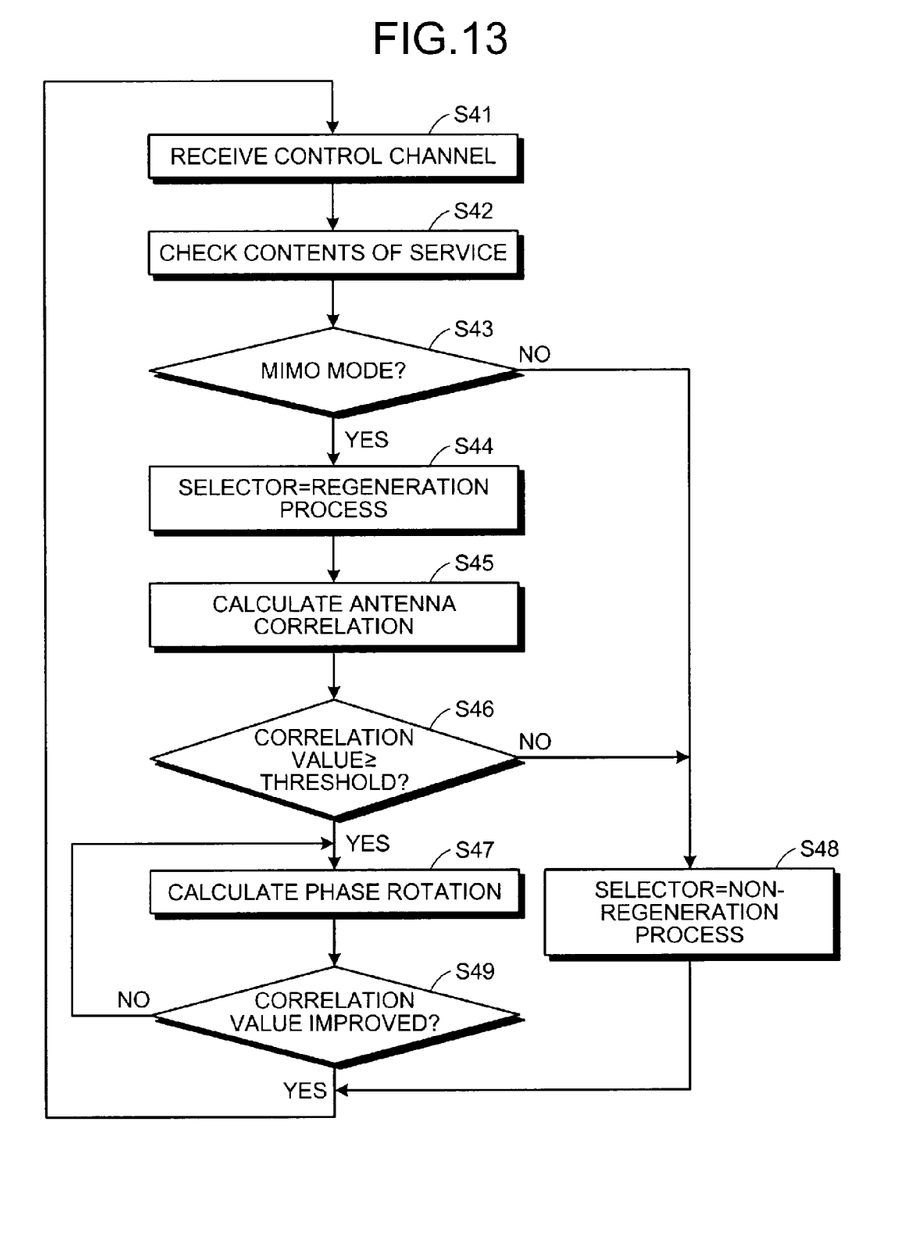
FIG. 13 is a flowchart of a wireless communication method according to the fourth embodiment.

FIG. 13 is a flowchart of a wireless communication method according to the fourth embodiment. As depicted in FIG. 13, the relay device receives the control channel during the multicast service (step S41), and checks the contents of the service (step S42). The relay device determines whether the mode is the MIMO mode (step S43). If so (step S43: YES), the relay device selects the regeneration process by the selector 37 and outputs the regeneration signal from the selector 37 (step S44). The relay device calculates the correlation value between the transmitting antenna and the receiving antenna based on the channel estimation value (step S45), and determines whether the correlation value is at least equal to the threshold (step S46). If the correlation value is more than or equal to the threshold (step S46: YES), the relay device calculates the amount of phase rotation by the phase-rotation-amount determining unit 83 (step S47). The relay device determines whether the correlation value has improved (step S49), and continues the calculation of the amount of phase rotation until the correlation value improves (step S49: NO, step S47). When the correlation value has improved (step S49: YES), the process returns to step S41. On the other hand, if the mode is not the MIMO mode (step S43: NO) or the correlation value is less than the threshold (step S46: NO), the relay device selects the non-regeneration process via the selector 37 and outputs the non-regeneration signal from the selector 37 (step S48), and the process returns to step S41. In the fourth embodiment, other components and operations are similar to the third embodiment.

According to the fourth embodiment, advantages similar to the second embodiment can be obtained. The amount of calculation performed by the relay device (such as phase rotation) can be reduced by switching between the regeneration process and the non-regeneration process, based on the antenna correlation, thereby reducing the power consumption of the relay device.

According to the relay device, the wireless communication system, and the wireless communication method, when receiving a multicast signal from the radio base station, the relay device transmits the received signal as is, without restoring the received signal to the original data, thereby reducing the delay amount induced by the relay device.

According to the relay device, the wireless communication system, and the wireless communication method disclosed herein, the mobile terminal can receive the signal transmitted through multicast communication from the radio base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
    a receiver that receives a wireless signal and outputs the received signal;
    a regenerator that restores original data from the received signal, and generates a regeneration signal from the original data;
    a non-regenerator that generates, using the received signal, a non-regeneration signal;
    a switching controller that selects and outputs the non-regeneration signal when the received signal is a multicast signal, and that selects and outputs the regeneration signal when the received signal is a unicast signal; and
    a transmitter that transmits a signal output from the switching controller as a transmission signal.

2. The relay device according to claim 1, wherein the switching controller switches between selection of the non-regeneration signal and selection of the regeneration signal, based on control channel information obtained by demodulating the received signal.

3. The relay device according to claim 1, wherein the switching controller switches between selection of the non-regeneration signal and selection of the regeneration signal in units of subframe of a wireless frame of the received signal.

4. The relay device according to claim 3, wherein the switching controller identifies a subframe of multicast communication by counting subframes, based on frame timing extracted from a synchronization channel.

5. The relay device according to claim 1, wherein the switching controller switches between selection of the non-regeneration signal and selection of the regeneration signal, based on channel information of a path from a radio base station.

6. A wireless communication system comprising:
    a multicast service device that provides multicast service;
    a radio base station that transmits a wireless unicast signal or a wireless multicast signal according to the multicast service;
    a relay device that
        receives a signal transmitted from the radio base station,
        restores original data from the received signal, generates a regeneration signal from the original data, and transmits the regeneration signal when the received signal is a unicast signal, and
        generates, using the received signal as is, a non-regeneration signal and transmits the non-regeneration signal when the received signal is a multicast signal; and
    a mobile terminal that receives a signal transmitted by the relay device.

7. The wireless communication system according to claim 6, wherein the relay device switches between transmission of the non-regeneration signal and transmission of the regeneration signal in units of subframe of a wireless frame.

8. The wireless communication system according to claim 6, wherein the relay device switches between transmission of the non-regeneration signal and transmission of the regeneration signal, based on channel information of a path from the radio base station.

9. A wireless communication method comprising:
    determining, during multicast service, whether a received signal is a multicast signal;
    generating, using the received signal as is, a non-regeneration signal and transmitting the non-regeneration signal when the received signal is the multicast signal; and
    restoring original data from the received signal, generating a regeneration signal from the original data, and transmitting the regeneration signal when the received signal is a unicast signal.

10. The wireless communication method according to claim 9, wherein transmission of the non-regeneration signal and transmission of the regeneration signal are switched in units of subframe of a wireless frame of the received signal.

11. The wireless communication method according to claim 10, wherein a subframe of multicast communication is identified by counting subframes, based on frame timing extracted from a synchronization channel.

12. The wireless communication method according to claim 9, wherein transmission of the non-regeneration signal and transmission of the regeneration signal are switched based on channel information of a path from a radio base station.

* * * * *